US010291761B2

(12) United States Patent
Paul

(10) Patent No.: US 10,291,761 B2
(45) Date of Patent: May 14, 2019

(54) DYNAMIC AND CONFIGURABLE RESPONSE TO INCOMING PHONE CALLS

(71) Applicant: Rubi Paul, Portland, OR (US)

(72) Inventor: Rubi Paul, Portland, OR (US)

( * ) Notice: Subject to any disclaimer, the term of this patent is extended or adjusted under 35 U.S.C. 154(b) by 21 days.

(21) Appl. No.: 15/473,213

(22) Filed: Mar. 29, 2017

(65) Prior Publication Data

US 2017/0208163 A1 Jul. 20, 2017

(51) Int. Cl.

*H04M 11/00* (2006.01)
*H04M 1/64* (2006.01)
*H04M 3/436* (2006.01)
*G10L 13/08* (2013.01)
*H04M 1/725* (2006.01)
*H04M 3/42* (2006.01)
*H04M 3/487* (2006.01)

(52) U.S. Cl.

CPC ........... *H04M 1/645* (2013.01); *H04M 3/436* (2013.01); *G10L 13/08* (2013.01); *H04M 1/72583* (2013.01); *H04M 3/42365* (2013.01); *H04M 3/4872* (2013.01); *H04M 2203/2072* (2013.01); *H04M 2203/306* (2013.01); *H04M 2203/351* (2013.01); *H04M 2203/352* (2013.01); *H04M 2242/28* (2013.01); *H04M 2250/74* (2013.01)

(58) Field of Classification Search

CPC .. H04M 1/247; H04M 1/642; H04M 1/72513; H04M 1/72519; H04M 1/72552; H04M 2250/74

USPC .......................................... 379/88.01–88.19

See application file for complete search history.

(56) References Cited

U.S. PATENT DOCUMENTS

| | | | | |
|---|---|---|---|---|
| 2006/0098792 A1* | 5/2006 | Frank | H04M 1/642 | 379/70 |
| 2011/0237228 A1* | 9/2011 | Chung | H04M 3/4288 | 455/414.1 |
| 2012/0269334 A1* | 10/2012 | Goguen | H04M 3/565 | 379/202.01 |
| 2012/0315880 A1* | 12/2012 | Peitrow | H04M 1/642 | 455/412.1 |
| 2013/0225134 A1* | 8/2013 | Earnshaw | H04M 3/533 | 455/413 |
| 2013/0324092 A1* | 12/2013 | Scott | H04M 3/533 | 455/413 |
| 2013/0324093 A1* | 12/2013 | Santamaria | H04M 1/72519 | 455/414.1 |
| 2014/0155039 A1* | 6/2014 | Kim | H04W 4/12 | 455/412.1 |
| 2015/0281441 A1* | 10/2015 | Kelly | H04M 3/493 | 379/88.01 |

* cited by examiner

*Primary Examiner* — Solomon G Bezuayehu

(57) ABSTRACT

A method is provided which comprises: receiving, by a phone, a phone call from a caller device; providing, by the phone, an indication of the phone call to a user of the phone; subsequent to providing the indication of the phone call, receiving (i) a selection of an option to decline the call with a customized audio message and (ii) an indication of a time duration; generating an audio message, the audio message indicating that the user of the phone is likely to call back the caller device within the time duration; and causing the audio message to be transmitted to the caller device.

15 Claims, 13 Drawing Sheets

Hello John, I am in a meeting. I will call you back in 15 minutes.

Fig. 2D

Hello Mr. Doe, I am in a meeting. I will call you back in 15 minutes.

Fig. 2E

Hello, I am with the baby. I will call you back in 30 minutes.

Fig. 2F

Hello, I am in a meeting. I will call you back in 15 minutes. You can leave a message after the beep.

Fig. 2G

Hello John, I am busy. I will call you back in 15 minutes. You can press “1” to leave a voice message.

Fig. 2H

Hello John, I am in a meeting and will be out in 30 seconds. Just hold on for 30 seconds and I will join the call. If you prefer to leave a Voice message, press 1.

Fig. 4D

Hello, Jane is in a meeting and will be out in 30 seconds. Just hold on, and she will join the call in 30 seconds or less. If you prefer to leave a Voice message, press 1. If you want to listen to music, press 2.

Fig. 4E

Hello, Can you please hold for 30 seconds. I am leaving the meeting room and will start talking within 30 seconds. If you prefer to leave a Voice message, press 1. If you want to listen to music, press 2.

Fig. 4F

It seems like Jane is still busy. Do you want to hold for a few more seconds? Or you can leave a voice message by pressing 1. Or you can just disconnect the call, and Jane will get an indication of a missed call from you

Fig. 4G

It seems like Jane is still busy. I will disconnect the call now. If you prefer, you may leave a voice message by pressing 1. Otherwise Jane will get an indication of a missed call from you

Fig. 4H

DYNAMIC AND CONFIGURABLE RESPONSE TO INCOMING PHONE CALLS

BACKGROUND

Often times, when a phone call is received by a device, a user of the device may not be readily available to take the call. In such instances, the caller may be greeted by a voice message prompt that the user of the device may have set in advance. The same voice message prompt may be played to all phone calls received by the device.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 2D-2H illustrate examples of textual versions of dynamic audio messages generated by the method of FIG. 2A, according to some embodiments.

FIGS. 4D-4H illustrate examples of device generated conversation, according to some embodiments.

DETAILED DESCRIPTION

Figure 1:
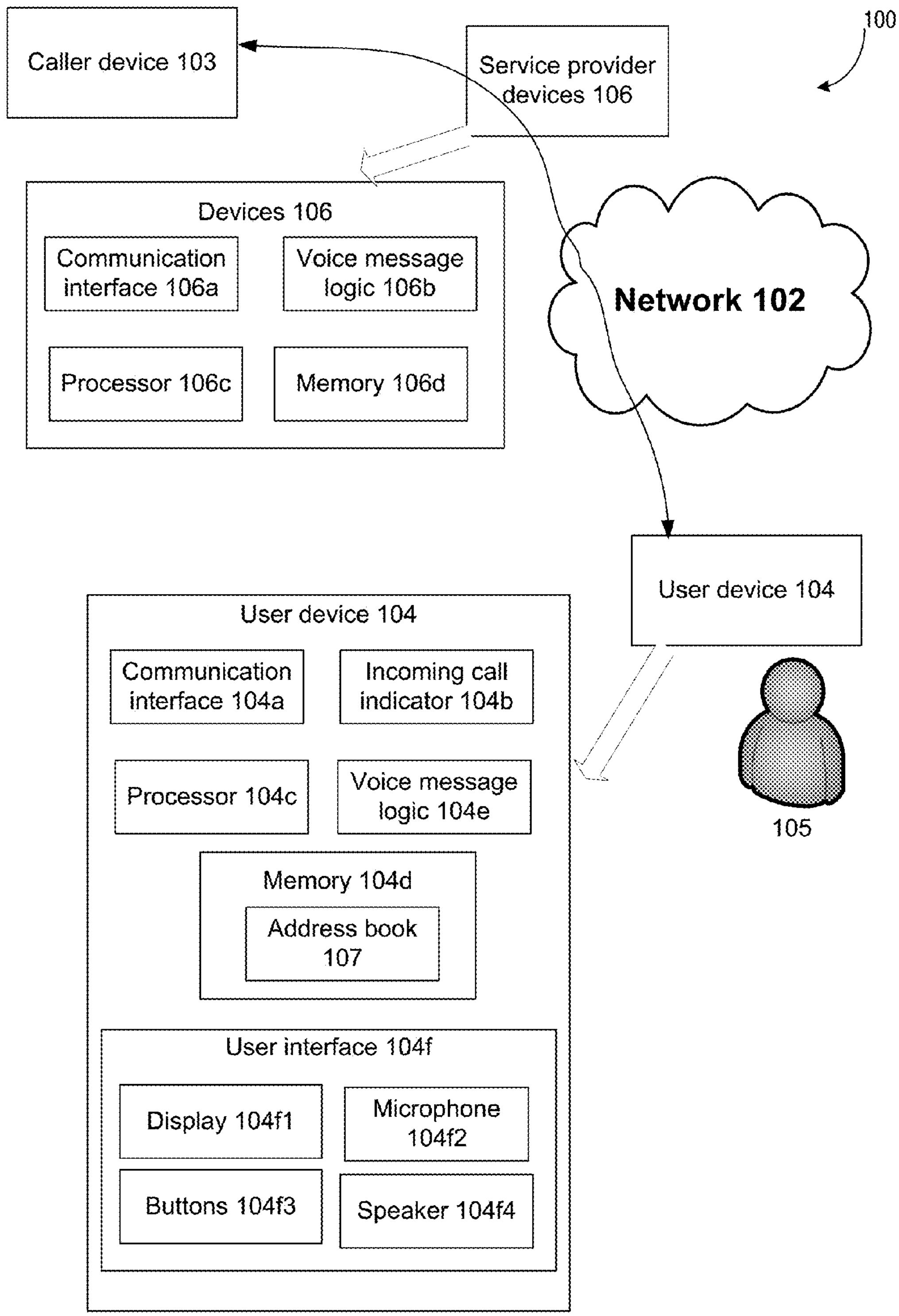
FIG. 1 illustrates a communication system comprising a user device communicating with a service provider devices over a network 102, wherein the system is configured to adaptively and dynamically respond to an incoming telephone call, in accordance with some embodiments.

FIG. 1 illustrates a communication system 100 (henceforth referred to as "system 100") comprising a user device 104 (henceforth referred to as device 100) communicating with service provider devices 106 (henceforth referred to as devices 106) over a network 102, wherein the system 100 (e.g., the device 104) is configured to adaptively and dynamically respond to an incoming telephone call, in accordance with some embodiments. Also illustrated in FIG. 1 is a user 105 of the device 104. Although a single user 105 is illustrated, the user 105 may represent one or more users who may use the device 105.

In some embodiments, the device 104 can be any appropriate device that may receive a phone call over the network 102. The network 102 may represent a network, or a combination of networks, over which (e.g., using which) a phone call may be received, and over which the device may communicate with the devices 106. Merely as an example, the network 102 may comprise a fixed phone network. For example, the network 102 may comprise a cellular network over which the device 104 may receive mobile phone calls. In another example, the network 102 may comprise a telephone network over which the device 104 may receive phone calls (e.g., phone calls to landline phones). For example, the network 102, or at least a part of the network 102, may operate in accordance with GSM (global systems for mobile communications), Long-Term Evolution (LTE), a 3rd Generation Mobile System (3GPP) or $5^{th}$ generation (5G) based system, CDMA (code division multiple access), TDM (time division multiplexing), any variations or derivatives thereof, other cellular service standards, and/or the like. The network 102 (or at least a part of the network 102) may also be the Internet or an Internet Protocol based network, and the phone call received by the device 104 may be, for example, voice over IP (VOIP) based call (e.g., using a service provide by Skype™ Google™ voice, Vonage™, and/or the like). In some embodiments, the network 102 may represent any one of the example networks discussed above, a combination of one or more networks discussed above, and/or similar networks. In some embodiments, the device 104 may be configured to receive a cellular call, a call that is transmitted using Internet Protocol, a phone call that is received over Wi-Fi or a cellular data connection, a fixed land-line based call, and/or the like, as would be readily understood by those skilled in the art.

In some embodiments, the device 104 may receive a phone call from a caller device 103, e.g., via the devices 106 and/or the network 102. The caller device 103 may be a cellular phone, a land line based phone, a smart phone, a tablet, a laptop, a computing device, and/or any consumer electronics device that may initiate a phone call.

In some embodiments, the device 104 can be any appropriate device that may receive a phone call over the network 102, e.g., a telephone, a smart phone, a cellular phone, a mobile phone, a laptop, a user equipment (UE), a desktop, a computing device, a tablet, a wearable device, an Internet of things (TOT), an appropriate consumer electronic device, a computing device, any device that may receive a phone call, and/or the like.

In some embodiments, the device 104 may comprise a communication interface 104*a* that may facilitate communication with the devices 106 over the network 102. The communication interface 104*a* may be, for example, a wireless communication interface, an Ethernet port, a USB port, a Thunderbolt port, a network interface, one or more antennas, and/or the like. For example, the device 104 may receive phone calls and communicate with the server 104 via the communication interface 104*a*.

In some embodiments, the device 104 may comprise an incoming call indicator 104*b*. The incoming call indicator 104*b* may comprise a vibration circuitry that may cause the device 104 (or a part of the device 104) to vibrate, to alert the user 105 of the device 104 about an incoming call. Additionally or alternatively, the incoming call indicator 104*b* may comprise a ring circuitry that may produce audible rings in response to the device 104 receiving a phone call. In some embodiments, a display 104*f*1 may also be a part of the incoming call indicator 104*b*.

In some embodiments, the device 104 may comprises one or more processor(s) 104*c*. The processor 104*c* may represent a single processing unit, or a number of processing units. A processing unit may include one or more computing units or processing cores. In some embodiments, the processor 104*c* may be implemented as one or more microprocessors, one or more microcontrollers, one or more microcomputers, digital signal processors, central processing units, state machines, logic circuitries, and/or any appropriate component that may process signals based on operational instructions. In some embodiments, the processor 104*c* may fetch and execute computer-readable instructions or processor-accessible instructions stored in one or more computer-readable storage media (e.g., a memory 104*d*).

In some embodiments, the memory 104*d* may be a computer-readable storage media for storing instructions, which may be executed by the processor 104*c* to perform the various functions described herein in this disclosure. Merely as an example, the memory 104*d* may include volatile memory and/or non-volatile memory. In some embodiments, the memory 104*d* may be capable of storing computer-readable, processor-executable program instructions as computer program code that may be executed by the processor 104*c*. For example, the memory 104*d* may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store information or instructions accessible by a computing device.

In some embodiments, among other information and instructions (e.g., program codes), the memory 104*d* may store an address book 107. In some embodiments, the address book 107 may include a phone number and/or a name (e.g., a first name and/or a last name) of one or more contacts listed in the address book 107.

In some embodiments, the device 104 may further comprise a voice message logic 104*e*. In some embodiments, the logic 104*e* may, for example, perform functions associated with a voice message of the device 104, as discussed in details herein later.

In some embodiments, the device 104 may further comprise one or more user interfaces (UI) 104*f*. For example, the UI 104*f* may comprise a display 104*f*1. The display 104*f*1 may be any appropriate type of display, e.g., a LCD display, a LED display, and/or the like. For example, the display 104*f*1 may comprise any appropriate type of display used in modern day smart phone or cellular phone, or any derivatives thereof. In some embodiments, the display may be touch sensitive (e.g., sensitive to a user touch, to a stylus, etc.). For example, the user 105 may communicate (e.g., indicate preference, select an option, answer a phone, dial a phone number, etc.) with the device 104 via the display 104*f*1.

In some embodiments, the UI 104*f* may also comprise a microphone 104*f*2. For example, the device 104 may receive sound from the user, including voice, via the microphone 104*f*2 (e.g., receive user's voice during a phone call, to activate a command, and/or the like).

In some embodiments, the UI 104*f* may also comprise one or more buttons 104*f*3. The buttons 104*f*3 may, in an example, comprise a dial pad or buttons using which the user 105 may dial a number in the device 104, select an option, etc. In some embodiments, the buttons 104*f*3 may also comprise an on-off button for turning the device 104 on or off, a volume button, or any appropriate button using which the user 105 may interact with the device 104.

In some embodiments, the UI 104*f* may also comprise a speaker 104*f*4, which may produce any appropriate sound, as would be readily understood by those skilled in the art.

Although the device 104 may have many other components, only some are illustrated in FIG. 1 for purposes of illustrative clarity.

In some embodiments, the devices 106 may represent any appropriate computing devices, servers, networks, or a combination thereof, which may be utilized by a service provider to provide a phone service to the device 104. For example, the devices 106 may include base stations, E-UTRAN Node B (e.g., Evolved Node B or eNB) of a cellular network, any infrastructure associated with providing a fixed land line call, an Internet Protocol based call, and/or the like.

Although the devices 106 may have many components, only some are illustrated in FIG. 1 for purposes of illustrative clarity. In some embodiments, the components of the devices 106 may not be located in a same geographical location and/or may not represent a single device or a single system. Rather, the devices 106 may encompass any component, system, network, servers, cloud based services, etc., which a phone service provider may use to provide a phone service and/or a voice message service to the device 104.

For example, the device 106 may comprise communication interface 106*a* to communicate with the device 104, where the communication interface 106*a* comprises base stations, eNBs, servers, cloud based computing services, etc., as would be readily understood by those skilled in the art.

In some embodiments, the devices 106 may comprise a voice message logic 106*b* that may provide services associated with voice messages for the device 104, as discussed herein in further details.

In some embodiments, the devices 106 may comprises one or more processor(s) 106*c*. The processor 106*c* may represent a single processing unit, or a number of processing units. A processing unit may include one or more computing units or processing cores. In some embodiments, the processor 106*c* may be implemented as one or more microprocessors, one or more microcontrollers, one or more microcomputers, digital signal processors, central processing units, state machines, logic circuitries, and/or any appropriate component that may process signals based on operational instructions. In some embodiments, the processor 106*c* may fetch and execute computer-readable instructions or processor-accessible instructions stored in one or more computer-readable storage media (e.g., a memory 106*d*).

In some embodiments, the memory 106*d* may be a computer-readable storage media for storing instructions, which may be executed by the processor 106*c* to perform the various functions described herein in this disclosure. Merely as an example, the memory 106*d* may include volatile memory and/or non-volatile memory. In some embodiments, the memory 106*d* may be capable of storing computer-readable, processor-executable program instructions as computer program code that may be executed by the processor 106*d*. For example, the memory 106*d* may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store information or instructions accessible by a computing device.

This disclosure discusses various UI windows having various options and messages. The style, location, formatting, and/or the actual wordings of these UI windows are merely examples, and for merely depicting the principles of this disclosure. Any other style, wordings, location and/or formatting of these UI windows may be easily envisioned by those skilled in the art.

This disclosure discusses various flowcharts illustrated in various figures. Although the blocks in individual flowchart are shown in a particular order, the order of the actions can be modified. Thus, the illustrated embodiments can be performed in a different order than illustrated in a flowchart, and some actions/blocks may be performed in parallel. The numbering of the blocks presented in a flowchart is for the sake of clarity and is not intended to prescribe an order of operations in which the various blocks must occur.

Configurable Audio Message in Response to a Phone Call

Figure 2A:
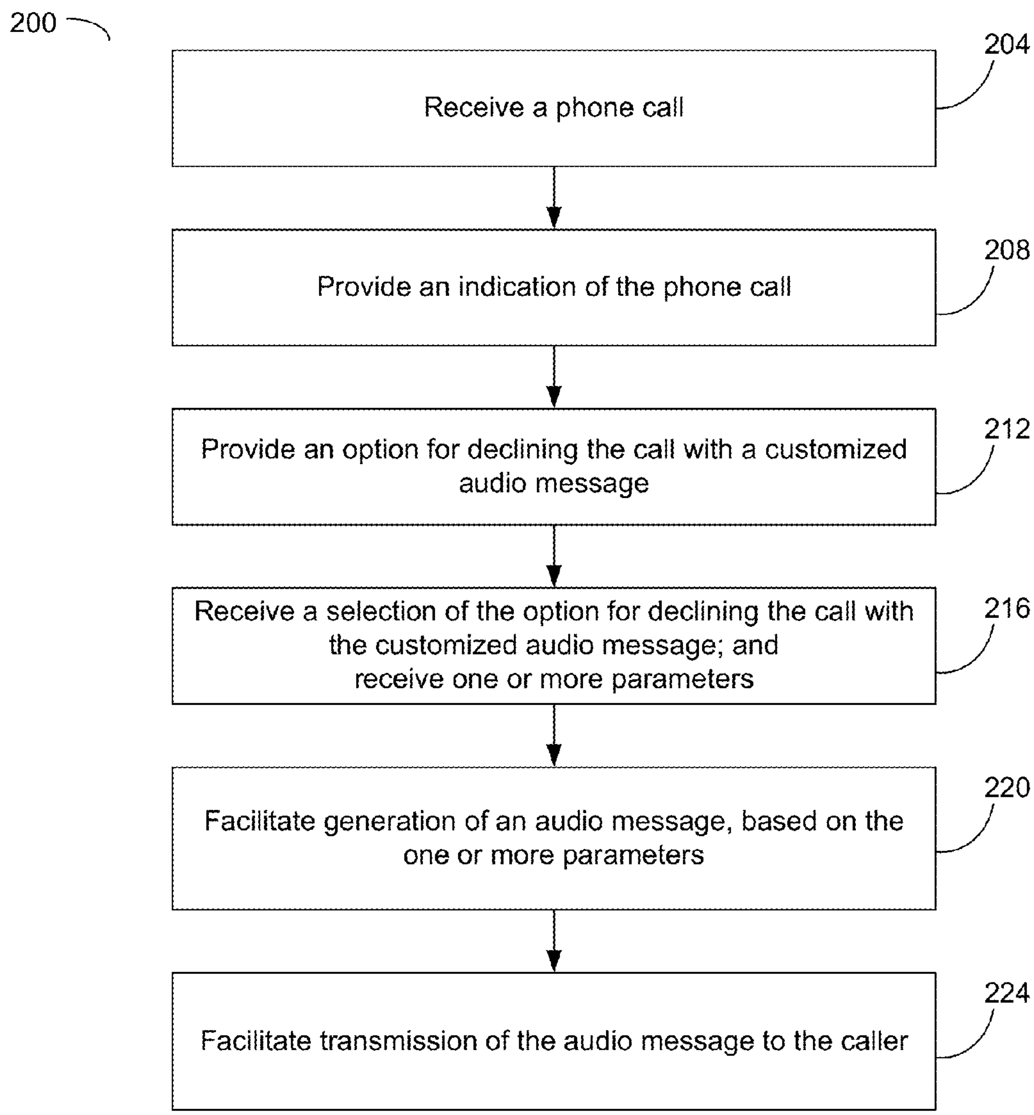
FIG. 2A illustrates a flowchart depicting a method for generating a customized audio message in response to a phone call, according to some embodiments.

FIG. 2A illustrates a flowchart depicting a method 200 to generate a customized audio message in response to a phone call, according to some embodiments. At 204, the device 104 may receive a phone call. At 208, the device 104 may provide an indication of the phone call to the user 105. For example, the incoming call indicator 104*b* may provide an indication of the phone call via vibration, via ringing of the phone (e.g., using the speaker 104*f*4), via visual display using the display 104*f*1, etc.

Figure 2B:
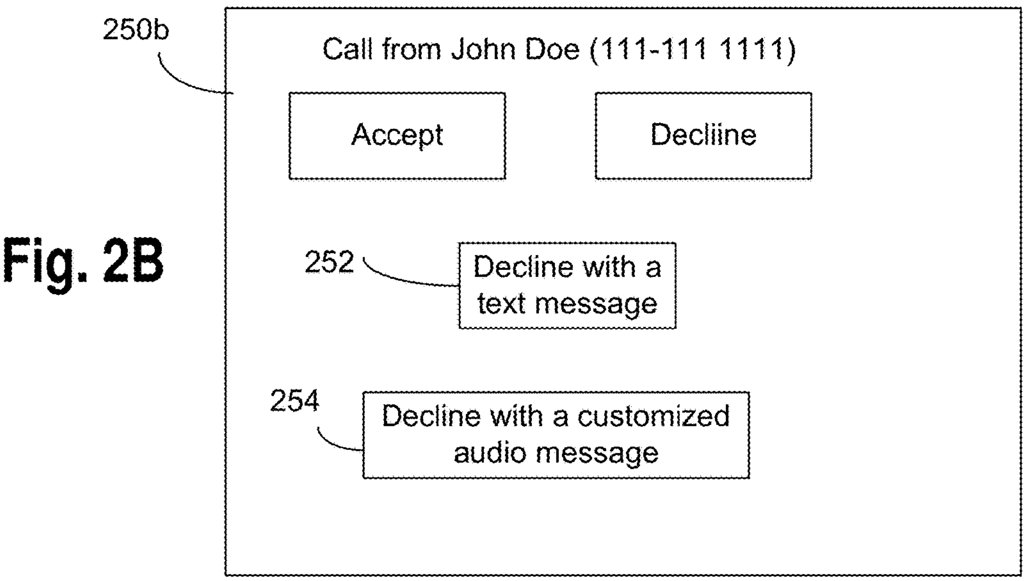
FIG. 2B illustrates an example UI window that may be displayed on a display to provide an indication of a phone call and to decline the phone call with a customized audio message, according to some embodiments.

FIG. 2B illustrates an example UI window 250*b* that may be displayed on the display 104*f*1 to provide an indication of a phone call and to decline the phone call with a customized audio message, according to some embodiments. For example, the UI window 250*b* may display a caller identification (e.g., a name of the caller) and/or a phone number from which the call is coming. For example, the caller identification may comprise a name of the caller from the address book 107. In another example, the name of the caller may be provided by the devices 106, e.g., based on the devices 106 identifying the call originating phone number and the associated name with the call originating phone number. The UI window 250*b* may also display options to accept or decline the call. The UI window 250*b* may also display an option 252 to decline the call with a return text message.

Referring again to FIG. 2A, at 212, the device 104 may provide an option (e.g., option 254 in the UI window 250*b* of FIG. 2B) to decline the call with a customized audio message. For example, referring to FIG. 2B, the UI window 250*b* displays the option 254 to decline the call with a customized audio message.

Figure 2C:
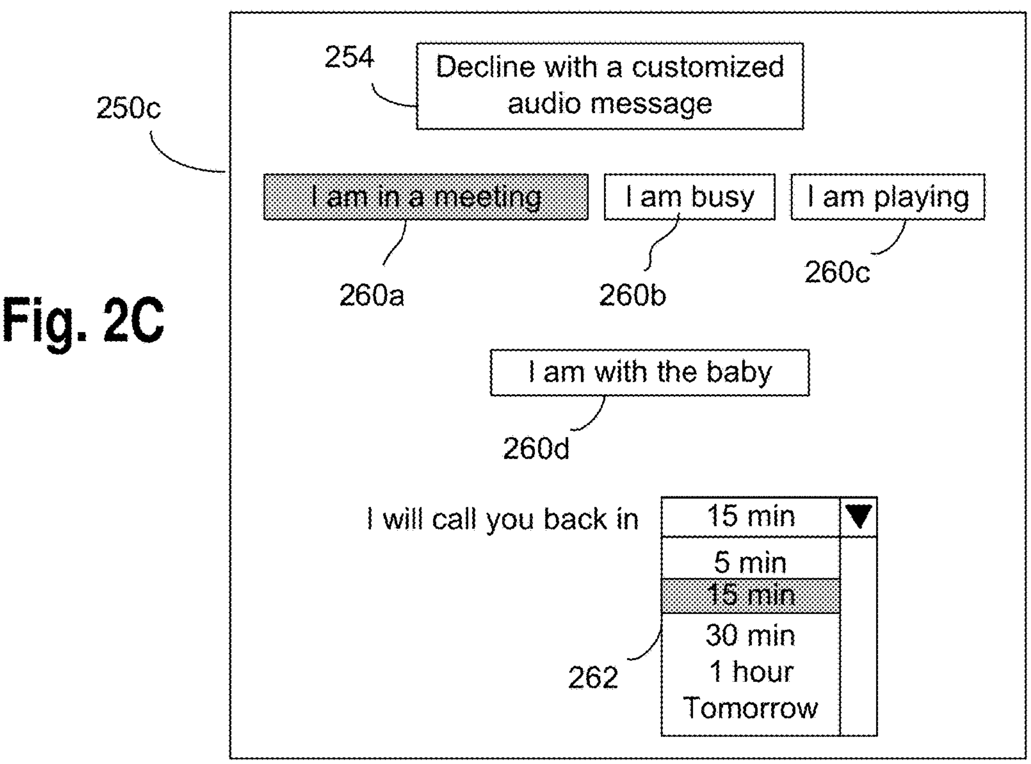
FIG. 2C illustrates an UI window that illustrates further options associated with an option to decline a phone call with a customized audio message, according to some embodiments.

FIG. 2C illustrates another UI window 250*c* that illustrates further options associated with the option 254 to decline the call with a customized audio message, according to some embodiments. Merely as an example, the user may select a reason (e.g., from one of many possible reasons 260*a*, 260*b*, 260*c*, 260*d*) for which the user is unable to attend the phone call. Additionally or alternatively, the user may select a time duration from a menu 262. Although a drop down style menu 262 is illustrated in FIG. 2C, the option to select the time duration may be presented in the UI window 250*c* in any appropriate manner (e.g., based on the style of presenting menus in the device 104). In some embodiments, the options 260*a*, . . . , 260*d* may be preset or pre-selected by the user.

In the example of FIG. 2C, the option 260*a* ("I am busy in a meeting") and the time duration "15 min." is selected, e.g., these selections are indicated using shaded boxes.

Referring again to FIG. 2A, at 216, the device 104 may receive a selection of the option (e.g., option 254) for declining the call with the customized audio message; and may also receive one or more parameters. The one or more parameters may include, for example, a selected option 260*a* and the selected time duration (e.g., of 15 minutes) from the menu 262.

At 220, the device 104 may facilitate generation of an audio message. The audio message may be generated, for example, based on the one or more parameters. In an example, the device 104 may generate the audio message, based on the one or more parameters. In another example, the device 104 may transmit the one or more parameters to a remote service, to enable the service to generate the audio message based on the one or more parameters. The service may be a cloud based service, and/or may be provided by the service provider of the device 104 (e.g., provided by the devices 106).

FIGS. 2D-2H illustrate examples of textual versions of the audio message generated at block 220 of the method 200 of FIG. 2A, according to some embodiments. In some embodiments, the audio message may include the first name and/or the last name of the caller (e.g., see FIGS. 2D and 2E), which may be obtained either from the address book 107, or from the caller identification. As illustrated, the audio messages may be generated based on the one or more parameters.

In some embodiments, the audio message may be generated using a text to speech synthesis software, e.g., a speech synthesizer. For example, at least a part of the voice of the audio message may be computer generated (e.g., generated by the device 104). In some embodiments, the user 105 may pre-record various options using a human voice (e.g., the voice of the user), and at least a part of the audio message may be generated using the pre-recorded voice.

In some embodiments, sections of the audio message may be pre-recorded by the user 105, and sections of the audio message may be generated on-the-fly by a text to speech synthesis software (e.g., where the software may reside locally within the device 104, or may reside remotely in the devices 106 or in a cloud based service). Merely as an example, referring to FIG. 2G, the part of the audio message "Hello, I am in a meeting. I will call you back in 15 minutes" may be generated by the text to speech synthesis software, and the section of the audio message "You can leave a message after the beep" may be pre-recorded by the user 105 using his or her voice. In another example, "I will call you back in" may be pre-recorded by the user using his or her voice, and "15 minutes" may be a machine generated voice.

The actual messages illustrated in FIGS. 2D-2H are mere examples, and do not limit the scope of the disclosure.

At 224, the user device 104 may facilitate transmission of the audio message to the caller device (e.g., to the phone number from which the call originated). For example, conventionally, if a user does not pick up a phone, a pre-recorded voice message greets the caller and typically asks the caller to leave a message (where the pre-recorded voice message is recorded and set-up in advance by the user). In contrast, in FIGS. 2A-2H, each instance the user 105 selects the option 254, a configurable voice message (i.e., the audio message discussed above) is generated on the fly or in real time—the audio message may be played to the caller device and the caller may optionally be asked to leave a voice message.

In some embodiments, the audio message may be played to the caller by device 104 (e.g., where the device 104 may act as an answering machine). Merely as an example, if the user 105 configures the device 104 to generate an audio message illustrated in FIG. 2H, the device 104 may play the audio message of FIG. 2H to the caller. In response to the caller pressing "1," the device 104 may transfer the call to a voice message service provided by the devices 106 (or the device 104 may record the voice message that the caller may leave).

FIGS. 2B-2C illustrate receiving the one or more parameters (e.g., as discussed in block 216 of FIG. 2A) based on which the audio message is generated, via user input using the display 104f1. However, in some other embodiments, the user 105 may select the option for declining the call with the customized audio message, and may select the one or more parameters for the audio message via any other appropriate manner. Merely as an example, the user may speak such options/parameters (e.g., without accepting the call, and for example, when the phone is still ringing or vibrating). For example, referring again to FIG. 2A, when the device 104 provides the indication of the phone call at 208, the device 104 may activate a microphone of the device 104 (e.g., automatically activate the microphone after providing the indication of the phone call). Subsequently, the user 105 may simply speak the option for declining the call. The microphone of the device 104 may capture the user talking. In some embodiments, the device 104 may include a speech decoder, using which the device 104 may understand that the user 105 desires to select the option for declining the call with the customized audio message. The user 105 may also verbally specify the one or more parameters, which the microphone of the device 104 may also capture. Subsequently, the device 104 may facilitate generation of the audio message, as illustrated in block 220 of FIG. 2A.

Figure 3A:
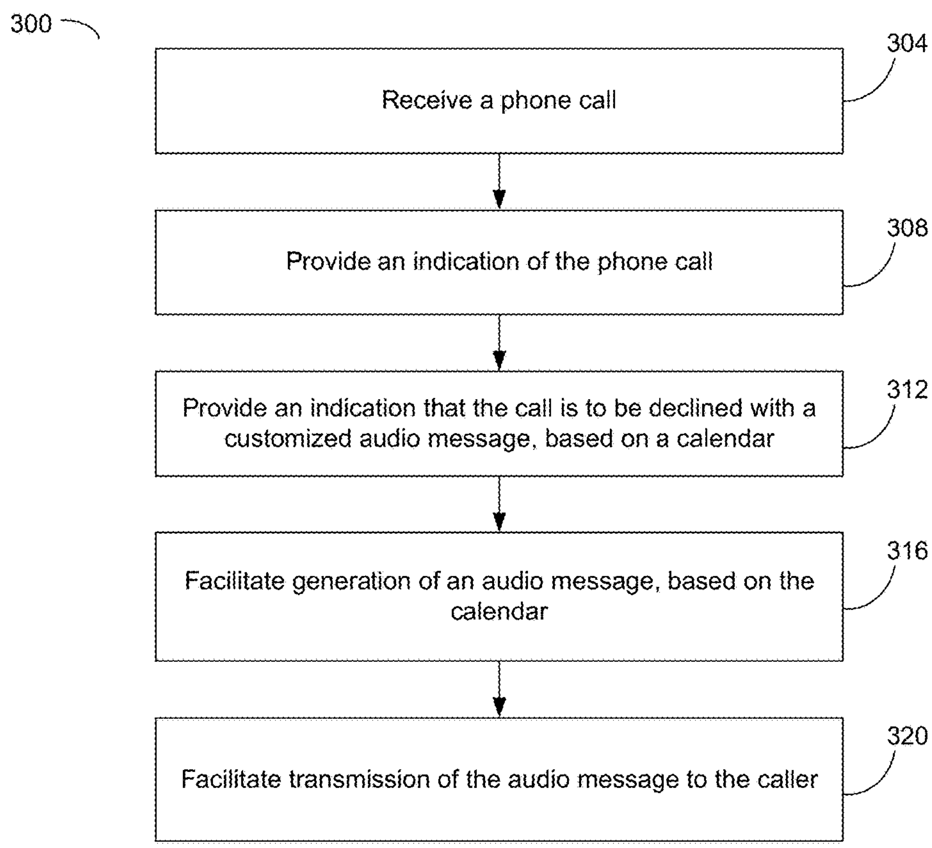
FIG. 3A illustrates a flowchart depicting a method for a device to generate a customized audio message in response to a phone call and based on entries of a calendar stored in the device, according to some embodiments.

Configurable Audio Message Based on a User Calendar, in Response to a Phone Call In FIGS. 2A-2H, the audio message may be generated based on one or more parameters identified by the user 105, after the device 104 receives the phone call. In some embodiments, the audio message may be generated at least in part based on a calendar containing appointments of the user 105. For example, FIG. 3A illustrates a flowchart depicting a method 300 for the device 104 to generate a customized audio message in response to a phone call and based on entries of a calendar stored in a memory (e.g., memory **104*d*) of the device 104, according to some embodiments. The calendar referred to in FIG. 3A may be any appropriate calendar stored in the device 104 (e.g., an Outlook™ calendar), where the calendar may store events, appointments, meetings, etc. of the user 105. The device 104 may have appropriate permission (e.g., granted by the user 105**) to access the calendar and generate audio messages.

At 304, the device 104 may receive a phone call. At 308, the device 104 may provide an indication of the phone call to the user 105. For example, the incoming call indicator **104*b* may provide an indication of the phone call via vibration, via ringing of the phone (e.g., using the speaker 104f4), via visual display using the display 104f1, etc. At 312, the device 104 may display an indication that the call may be declined with a customized audio message, based on a calendar (e.g., if the call is not answered by the user 105** within a threshold number of rings).

Figure 3B:
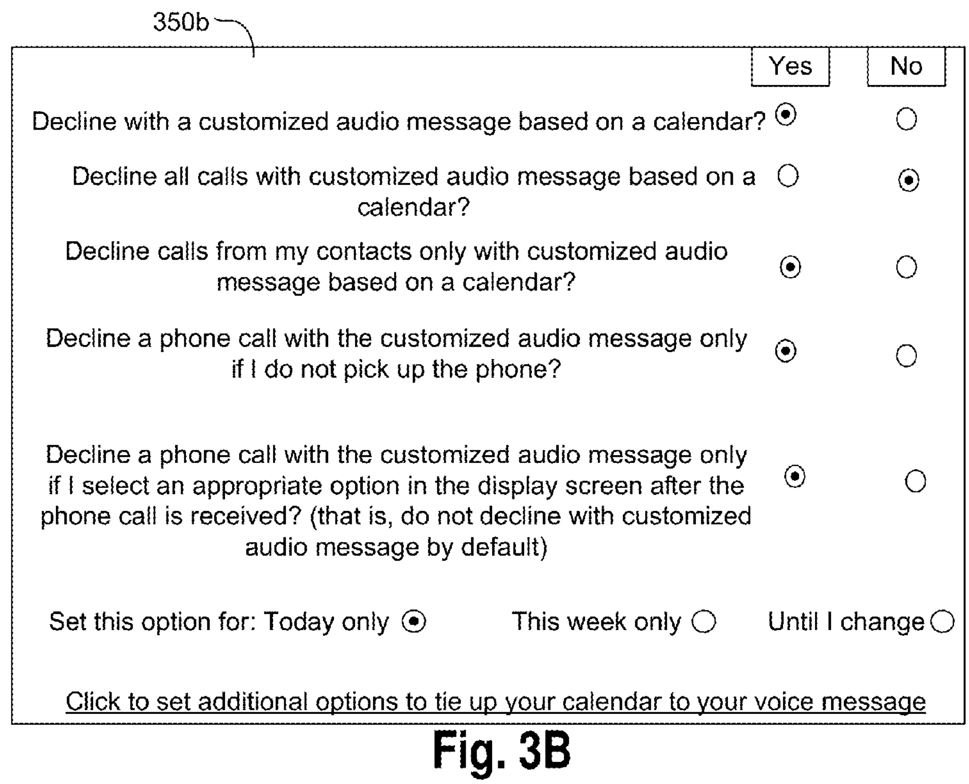
FIG. 3B illustrates an example UI window that may be displayed on a display of a device to allow a user to customize generation of audio messages based on a calendar stored in the device, according to some embodiments.

FIG. 3B illustrates an example UI window **350*b* that may be displayed on the display 104f1 to allow the user 105 to customize generation of audio messages based on the calendar, according to some embodiments. The UI window 350*b*** may be self-explanatory in view of the other figures and the specification, and is not discussed in further details.

Figure 3C:
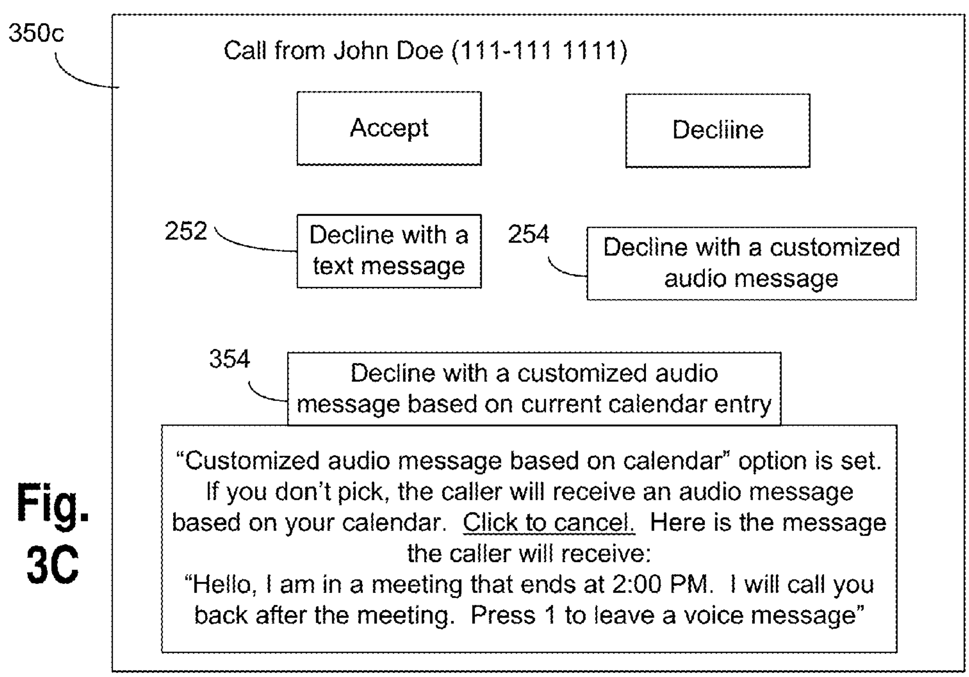
FIG. 3C illustrates an example UI window that may be displayed on a display in response to a phone call and to alert a user that an audio message is to be played to the caller based on a current calendar entry, according to some embodiments.

FIG. 3C illustrates an example UI window **350*c* that may be displayed on the display 104f1 in response to a phone call and to alert the user that an audio message is to be played to the caller based on a current calendar entry, according to some embodiments (e.g., as discussed in block 312 of FIG. 3A). For example, if the current time is 1:45 PM and if the calendar entry indicates that the user has a meeting between 1 PM to 2 PM, the device 104 may access the calendar of the user 105 stored in the device 104, and may determine that the user 105 is in the meeting until 2 PM. In some embodiments, the device 104 may provide an option 354 for declining the phone call with a customized audio message based on current calendar entry. In some embodiments, the device 104 may provide the following indication to the user 105, as illustrated in FIG. 3C: ""Customized audio message based on calendar" option is set. If you don't pick up, the caller will receive an audio message based on your calendar. Click to cancel. Here is the message the caller will receive . . . ." The device 104 may also display the following message to the user 105: "Hello, I am in a meeting that ends at 2:00 PM. I will call you back after the meeting. Press 1 to leave a voice message." In some embodiments, this message may then be translated to an audio message, e.g., for playing back to the caller, if the user 105** does not pick up the phone.

Referring again to FIG. 3A, at 316, the device 104 may facilitate generation of an audio message, based on the calendar entry at the time when the call is received. Generation of audio messages has been discussed in detail with respect to FIG. 2A. For example, the device 104 may generate at least a part of the audio message using a text to speech synthesis program or a speech synthesizer. In another example, a remote service may generate at least a part of the audio message using a text to speech synthesis program. In yet another example, at least a part of the audio message may be pre-recorded by the user 105. At 320, the device 104 may facilitate transmission of the audio message to the caller, e.g., as also discussed with respect to block 224 of FIG. 2.

Start Device Generated Conversation to Engage the Caller for a Short Duration

In an example, the user 105 may be in a meeting when a call comes to the device 104. The user 105 may desire to take the call, but it may take about 30 seconds for the user 105 to get out of the meeting room and start talking. However, if the user 105 waits for 30 seconds, the caller can disconnect the call and/or the call can go to a voice message prompt of the device 104. On the other hand, the user 105 may press the "talk" button and receive the call, but may be unable to talk for the next 30 seconds, as the user 105 may take 30 seconds to exit the room and may not want to talk or whisper while in the meeting room.

Figure 4A:
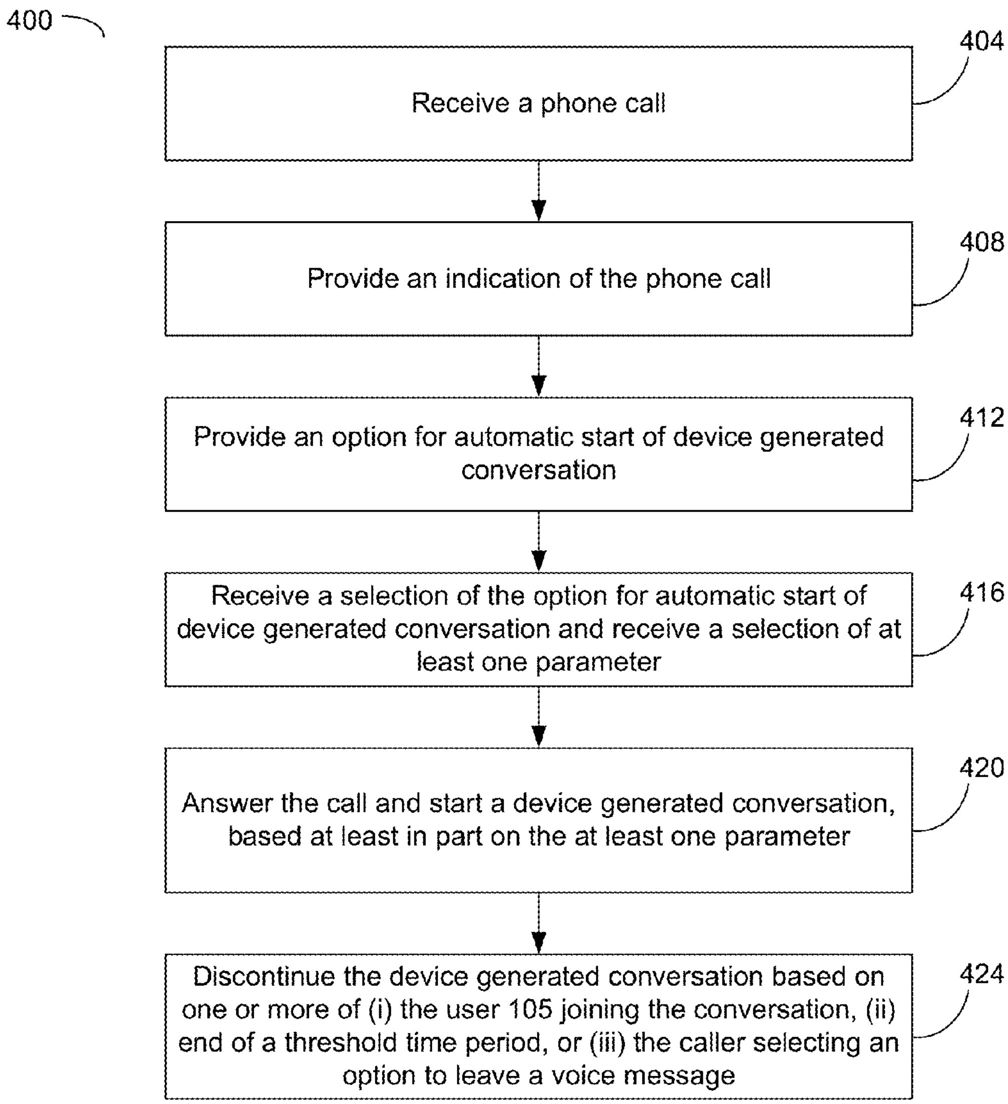
FIG. 4A illustrates a flowchart depicting a method for a device to start a device generated auto-conversation for at least a user-configurable period of time, according to some embodiments.

In some embodiments, to address such problems, the device 104 may provide an option for starting auto-conversation. For example, FIG. 4A illustrates a flowchart depicting a method 400 for the device 104 to start a device-generated auto-conversation for at least a user-configurable period of time, according to some embodiments.

At 404, the device 104 may receive a phone call from a caller. At 408, the device 104 may provide an indication of the phone call to the user 105. For example, the incoming call indicator 104*b* may provide an indication of the phone call via vibration, via ringing of the phone (e.g., using the speaker 104*f*4), via visual display using the display 104*f*1, etc. At 412, the device 104 may also provide an indication of an option for automatic start of device generated conversation.

Figure 4B:
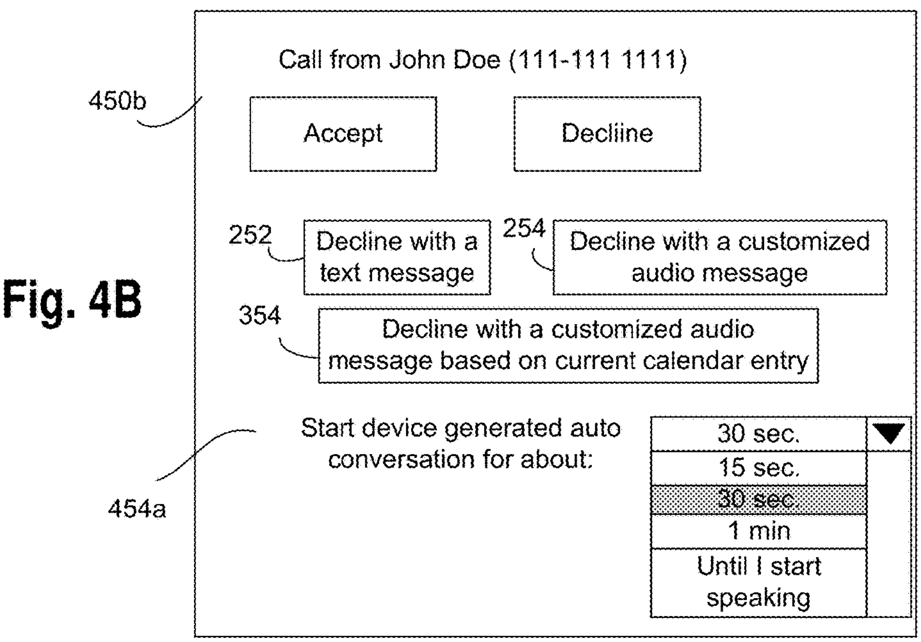
FIG. 4B illustrates an example UI window that may be displayed on a display to provide an indication of a phone call and also an indication of an option for automatic start of device generated conversation, according to some embodiments.

FIG. 4B illustrates an example UI window 450*b* that may be displayed on the display 104*f*1 to provide an indication of the phone call and also an indication of an option for automatic start of device generated conversation, according to some embodiments. For example, the UI window 450*b* may display a caller identification (e.g., a name of the caller) and/or a phone number from which the call is coming. For example, the caller identification may comprise a name of the caller from the address book 107. In another example, the name of the caller may be provided by the devices 106, e.g., based on the devices 106 identifying the call originating phone number and associated the name with the call originating phone number. The UI window 450*b* may also display options to accept or decline the call. The UI window 450*b* may also display an option 252 to decline the call with a return text message. The device 104 may also provide an option 254 to decline the call with a customized audio message, e.g., as discussed with respect to FIGS. 2A-2G.

In some embodiments, the UI window 450*b* may also provide an option 454*a* to start a device-generated auto conversation, according to some embodiments. For example, the option 454*a* may also provide user selectable time duration (e.g., in seconds or minutes). FIG. 4B illustrates a selection of an example time duration of 30 seconds.

Figure 4C:
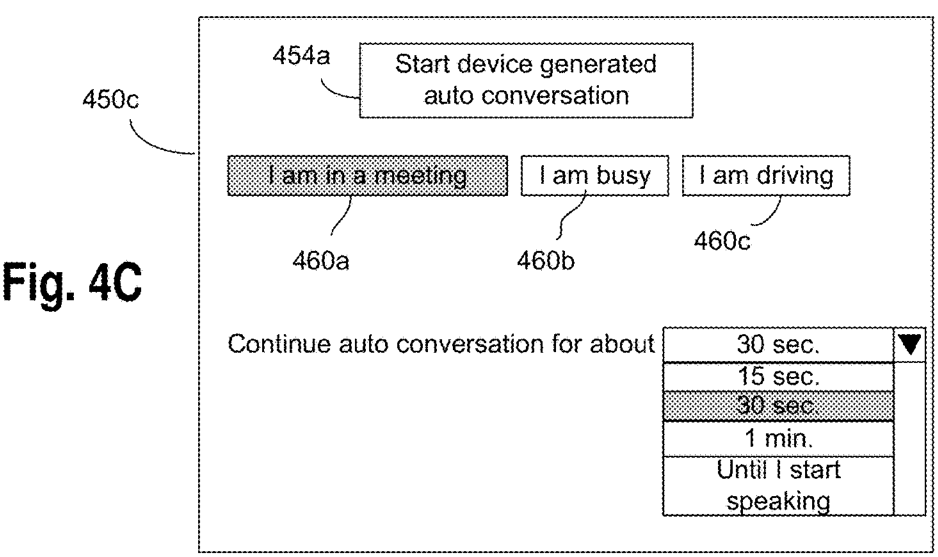
FIG. 4C illustrates an example UI window for various options associated with device-generated auto conversation, according to some embodiments.

FIG. 4B merely illustrates an example UI window for the option 454*a*. FIG. 4C illustrates another example UI window 454*c* for various options associated with device-generated auto conversation, according to some embodiments. For example, FIG. 4C illustrates a menu for selecting a time duration for the auto-conversation, and a reason for the user 105 not being able to start a conversation immediately.

Referring again to FIG. 4A, at 416, the device 104 may receive a selection of the option for automatic start of device generated conversation and receive a selection of at least one parameter (e.g., likely duration of such auto-generated conversation, a reason for the user being busy, etc., as discussed with respect to FIGS. 4B-4C).

At 420, the device 104 may answer the call and start a device generated conversation, based at least in part on the at least one parameter. FIGS. 4D-4H illustrate examples of device generated conversation, according to some embodiments. In some of the figures, Jane is assumed to be the name of the user 105. At least a part of the device-generated audio conversation may be generated by the device 104 or generated by a remote service, e.g., based on a text to speech synthesis software, a speech synthesizer, etc. In another example, at least a part of the audio conversation may be pre-recorded by the user 105 (e.g., using his or her own voice).

At 424, the device 104 may discontinue the device generated conversation, e.g., based on one or more of (i) the user 105 joining the conversation, (ii) end of a threshold time period, or (iii) the caller selecting an option to leave a voice message.

Merely as an example, if the user 105 specifies 30 seconds for the device generated conversation and if the user 105 does not join the call within about 45 seconds of the start of the device-generated conversation, the device 104 may say something like this to the caller "it seems like Jane is still busy. Do you want to hold for a few more seconds? Or you can leave a voice message by pressing 1. Or you can just disconnect the call, and Jane will get an indication of a missed call from you," as illustrated in FIG. 4G. In yet another example, if the user 105 does not get in the call within, say, about 2 minutes, the device can generate and convey an audio message like that displayed in FIG. 4H.

In some embodiments, the user 105 may join the call and take over from conversation from the device 104 by, for example, simply starting to speak, or by pressing a button or an option displayed in the display of the device 104.

Extending the Time Duration of Ringing of the Device 104

In an example, when a phone call comes in the device 104, the user 105 may be busy, for example, washing dishes or attending a meeting. Typically, the device 104 may ring for a threshold number of rings (e.g., 5 rings or 6 rings), and then the phone call may go to a voice message prompt of the user 105 (or may simply be disconnected). For example, the phone may ring for, merely as an example, 20 seconds before going to the voice message prompt or before getting disconnected. However, the user 105 may be able to attend to the phone after 30 seconds.

Figure 5A:
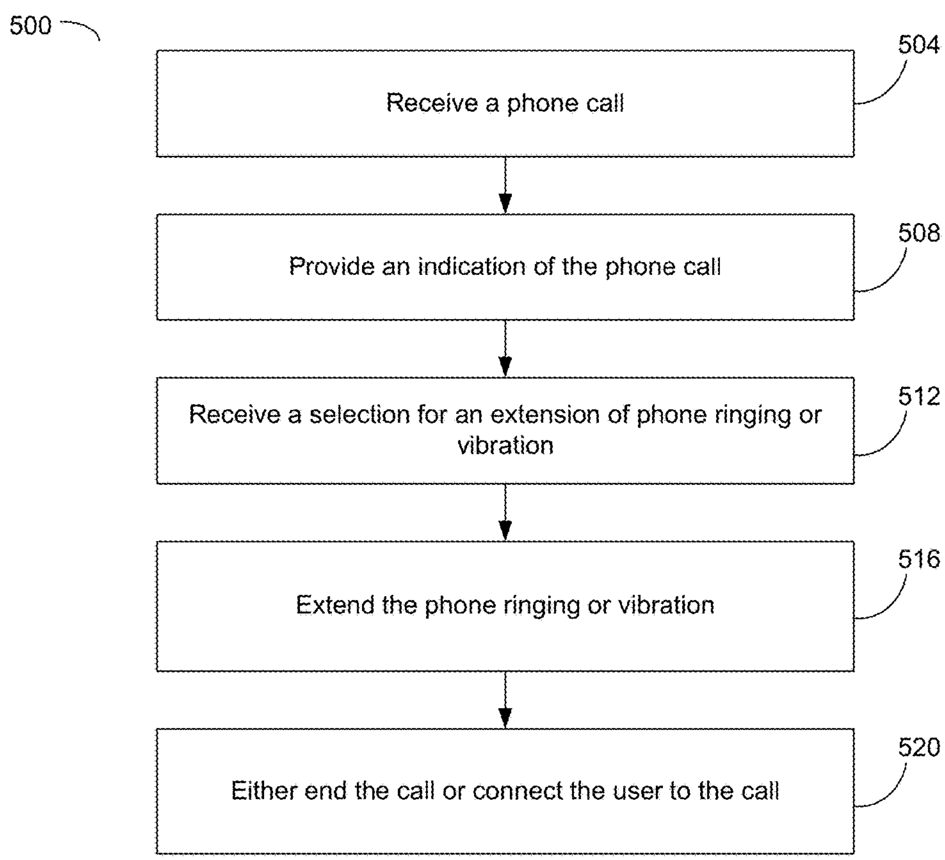
FIG. 5A illustrates a flowchart depicting a method for a device to extend a ringing or vibration of the device before the phone call gets disconnected, according to some embodiments.

In some embodiments, in such situations, the user 105 may instruct the device 104 to extend the duration of time (or a number of rings) for which the device 104 rings (or vibrates), before going to the voice message prompt. FIG. 5A illustrates a flowchart depicting a method 500 for the device 104 to extend a ringing or vibration of the device 104 before the phone call gets disconnected, according to some embodiments.

At 504, the device 104 may receive a phone call from a caller. At 508, the device 104 may provide an indication of the phone call to the user 105. For example, the incoming call indicator 104*b* may provide an indication of the phone call via vibration, via ringing of the phone (e.g., using the speaker 104*f*4), via visual display using the display 104*f*1, etc.

At 512, the device 104 may receive a selection for an extension of phone ringing or vibration, e.g., receive a selection to extend a duration of time before which the phone call gets disconnected (e.g., to extend a time that the user 105 has to attend to the phone call).

In some embodiments, the selection at 512 may be received verbally by the device 104. For example, after the phone call is received (and without the user 105 answering to the phone call), the device 104 may activate a microphone of the device 104 (e.g., automatically activate the microphone after providing the indication of the phone call). Subsequently, the user 105 may simply speak the option for the extending the phone ringing or vibration duration. The microphone of the device 104 may capture the user making the verbal command. In some embodiments, the device 104 may include a speech decoder, using which the device 104 may understand that the user 105 desires to select the option for extending the ring/vibration duration. The user 105 may also verbally specify one or more parameters (e.g., extend the ring/vibration by "X" number of seconds, or "Y" number of rings, where X and Y are parameters verbally specified by the user 105), which the microphone of the device 104 may also capture.

Figure 5B:
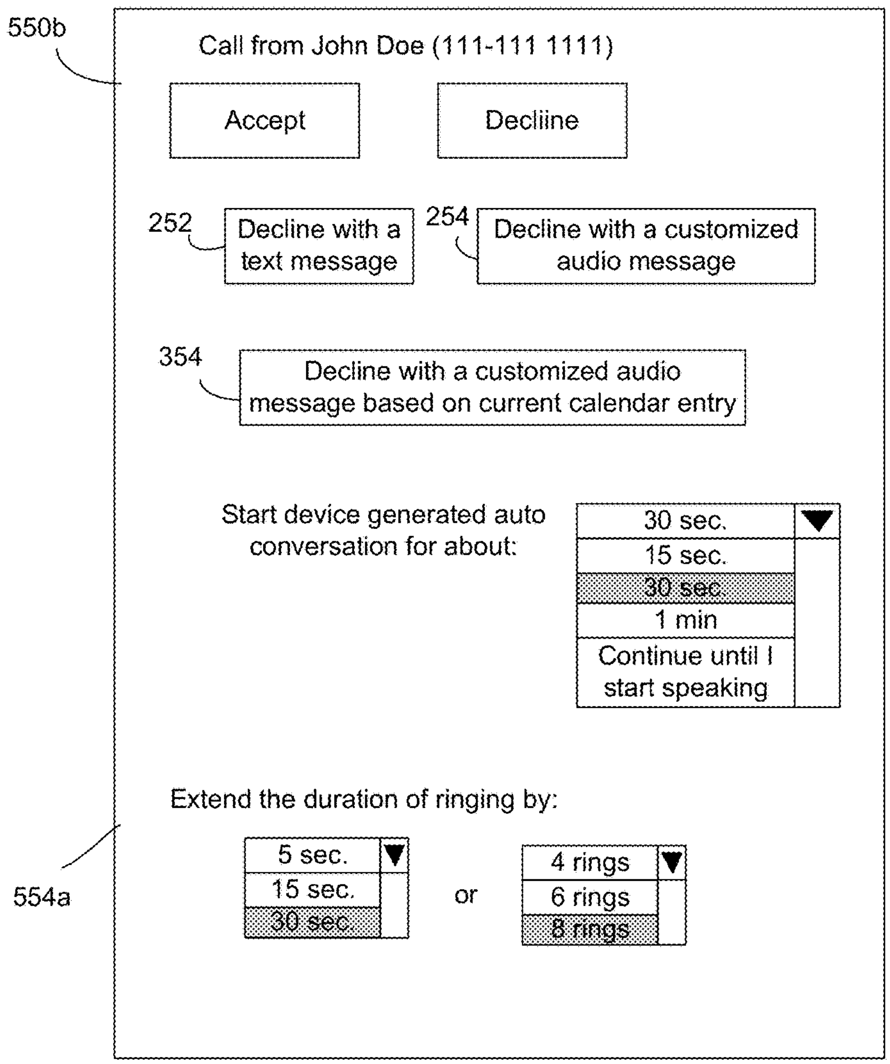
FIG. 5B illustrates an example UI window that may be displayed on a display in response to a phone call and to extend a ringing or vibration of the device before the phone call gets disconnected, according to some embodiments.

In some embodiments, the selection at 512 may also be received by the device 104 via the display of the device 104. FIG. 5B illustrates an example UI window 550*b* that may be displayed on the display 104*f*1 in response to a phone call and to extend a ringing or vibration of the device 104 before the phone call gets disconnected, according to some embodiments. For example, after the phone call is received (and without the user 105 answering to the phone call), the device 104 may display the UI window 550*b* comprising an option 554*a* to extend the ringing/vibration of the device. The user 105 may select, using the option 554*a*, one or more parameters (e.g., extend the ring/vibration by "X" number of seconds, or "Y" number of rings, where X and Y are parameters verbally specified by the user 105).

Referring again to FIG. 5A, the device 104 may extend the ringing/vibration of the device 104 in response to the phone call, e.g., before the call gets disconnected, e.g., based on the selection received at 312. The extension may be based on the "X" seconds and/or "Y" number of rings, as discussed herein above.

At 520, the device 104 may disconnect the phone call (e.g., such that the caller is directed to a voice message prompt) after the expiration of "X" seconds or "Y" number of rings, or connect the user 105 to the call (e.g., in response to the user 105 attending the call).

CONCLUSION

Throughout this disclosure, various UI windows and example messages have been illustrated. It should be noted that the wordings, formats, sizes, contents, and/or language of these UI windows and messages are merely examples, and may be modified by those skilled in the art based on the principles of this disclosure.

There are numerous advantages of various embodiments. For example, a conventional answering machine (which, for example, may be coupled to a traditional land line based phone) may provide an answering service by, for example, providing an audio message to a caller device making a phone call. In such a conventional answering machine, the user may set the audio message once, and the same message is repeated for all the calls. In another example, in a conventional cellular phone, a user sets up a voice message once, and the same message is repeated for all the calls. Such generic non-dynamic audio messages in conventional systems do not provide real time updates about the user's whereabouts or provide any type of real time and meaningful information.

In contrast, in various embodiments of this disclosure, a dynamic audio message can convey real time, up-to-date and meaning information to the caller. For example, the audio message may indicate that the user is busy for 15 minutes, and is likely to call back within 15 minutes. In another example, the user device may access the calendar of the user, and generate the audio message based on a current appointment noted in the calendar. In yet another example, the audio message may inform the caller to hold for a few seconds, as the user is likely to start talking in a few seconds. In yet another example, the user device can extend the duration of the ringing of the phone, to provide the user with, for example, a few extra seconds to answer the phone. Such advantages provide better calling experience to the caller of the phone call as well as to the user of the call receiving device.

Some of the embodiments discussed herein refers to transmission of an audio message from the device 104 to a caller (e.g., to the caller device 103). As would be readily understood by those skilled in the art, in some embodiments, transmission of an audio message from a device (e.g., device 104) to another (e.g., the caller device 103) may, for example, be performed based on the device 104 generating a digital representation of the audio message, and transmitting such a digital representation of the audio message. In some embodiments, the caller device 103 may receive the digital representation of the audio message, reconstruct the audio message, and eventually play the audio message to a caller of the calling device 103. In some embodiments, various other functions may also be performed. In some embodiments, a collection of all these functions may generally referred to as transmission of an audio message from the device 104 to the caller device 103.

Example Device Architecture

Figure 6:
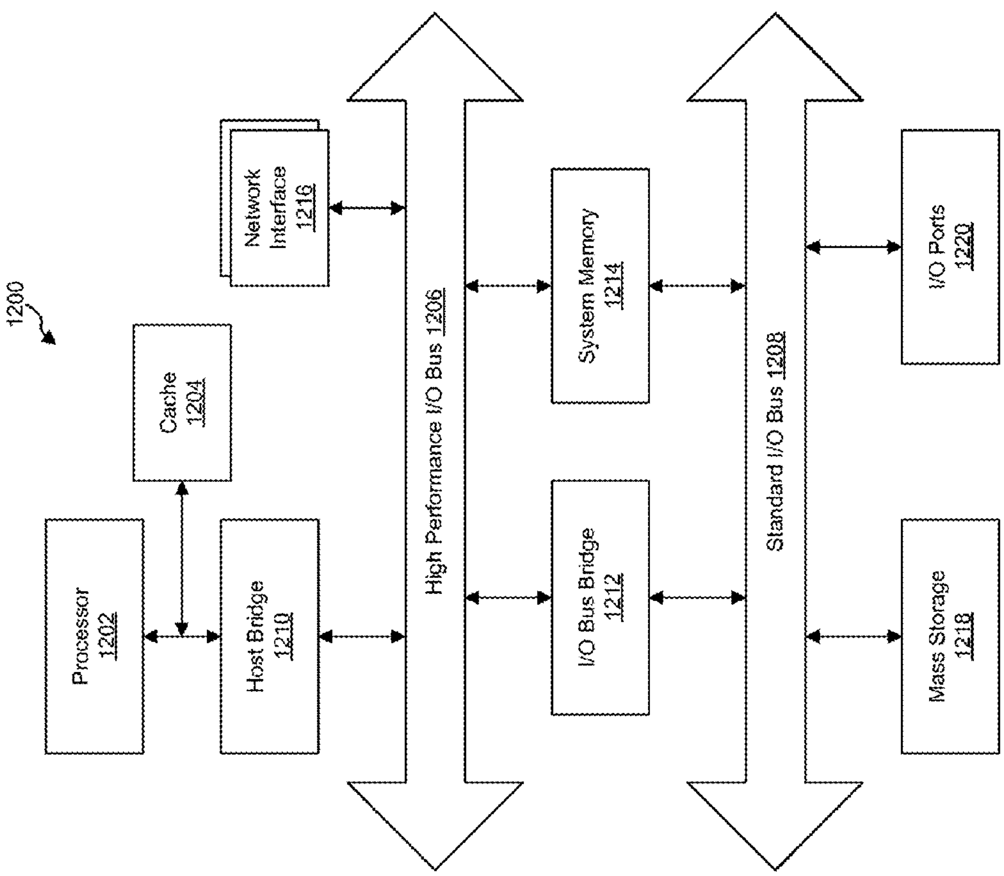
FIG. 6 illustrates an example of a computer system that may be used to implement one or more of the embodiments described herein, according to some embodiments.

FIG. 6 illustrates an example of a computer system 1200 that may be used to implement one or more of the embodiments described herein, according to some embodiments. The computer system 1200 may include sets of instructions for causing the computer system 1200 to perform the processes and features, e.g., operations, discussed herein (e.g., discussed with respect to FIGS. 1-5B). The computer system 1200 may be connected (e.g., networked) to other machines. In a networked deployment, the computer system 1200 may operate in the capacity of a server machine or a client machine in a client-server network environment, or as a peer machine in a peer-to-peer (or distributed) network environment. In an embodiment of the invention, the computer system 1200 may be a component of the networking system described herein. In an embodiment of the present disclosure, the computer system 1200 may be one server among many that constitutes all or part of a networking system.

In some embodiments, the computer system 1200 may represent the user device 104 of FIG. 1.

The computer system 1200 can include a processor 1202, a cache 1204, and one or more executable modules and drivers, stored on a computer-readable medium, directed to the processes and features described herein. Additionally, the computer system 1200 may include a high performance input/output (I/O) bus 1206 or a standard I/O bus 1208. A host bridge 1210 couples processor 1202 to high performance I/O bus 1206, whereas I/O bus bridge 1212 couples the two buses 1206 and 1208 to each other. A system memory 1214 and one or more network interfaces 1216 couple to high performance I/O bus 1206. The computer system 1200 may further include video memory and a display device (e.g., the display 104*f*1 of FIG. 1) coupled to the video memory (not shown). Mass storage 1218 and I/O ports 1220 couple to the standard I/O bus 1208. The computer system 1200 may optionally include a keyboard and pointing device, a display device, or other input/output devices (not shown) coupled to the standard I/O bus 1208. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1200, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1200 are described in greater detail below. In particular, the network interface 1216 provides communication between the computer system 1200 and any of a wide range of networks, such as an Ethernet (e.g., IEEE 802.3) network, a backplane, etc. Network interface 1216 may provide communications over a wired and/or wireless communication link. The mass storage 1218 provides permanent storage for the data and programming instructions to perform the above-described processes and features implemented by the respective computing systems identified above, whereas the system memory 1214 (e.g., DRAM) provides temporary storage for the data and programming instructions when executed by the processor 1202. The I/O ports 1220 may be one or more serial and/or parallel communication ports that provide communication between additional peripheral devices, which may be coupled to the computer system 1200.

The computer system 1200 may include a variety of system architectures, and various components of the computer system 1200 may be rearranged. For example, the cache 1204 may be on-chip with processor 1202. Alternatively, the cache 1204 and the processor 1202 may be packed together as a "processor module", with processor 1202 being referred to as the "processor core". Furthermore, certain embodiments of the invention may neither require nor include all of the above components. For example, peripheral devices coupled to the standard I/O bus 1208 may couple to the high performance I/O bus 1206. In addition, in some embodiments, only a single bus may exist, with the components of the computer system 1200 being coupled to the single bus. Furthermore, the computer system 1200 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1200 that, when read and executed by one or more processors, cause the computer system 1200 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1200, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1202. Initially, the series of instructions may be stored on a storage device, such as the mass storage 1218. However, the series of instructions can be stored on any suitable computer readable storage medium. Furthermore, the series of instructions need not be stored locally, and could be received from a remote storage device, such as a server on a network, via the network interface 1216. The instructions are copied from the storage device, such as the mass storage 1218, into the system memory 1214 and then accessed and executed by the processor 1202. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar storage medium; or any type of medium suitable for storing, encoding, or carrying a series of instructions for execution by the computer system 1200 to perform any one or more of the processes and features described herein.

A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "computer program product" refers to a machine, system, device, and/or manufacture that includes a computer-readable storage medium.

Figure 7:
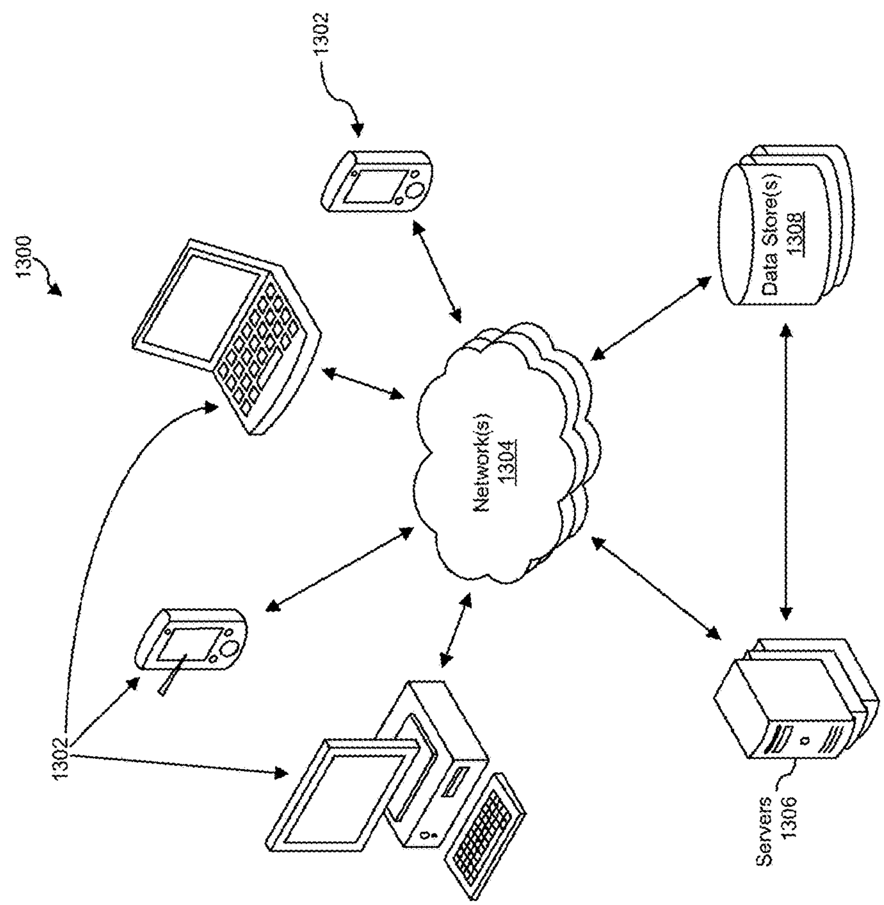
FIG. 7 illustrates an example network system embodiment (or network environment) for implementing aspects, according to some embodiments.

As discussed, different approaches can be implemented in various environments in accordance with the described embodiments. For example, FIG. 7 illustrates an example network system embodiment (or network environment) 1300 for implementing aspects, according to some embodiments. The example network system 1300 can include one or more computing devices, computing systems, electronic devices, client devices, etc. (e.g., 1302). In some instances, each of these devices and/or systems 1302 can correspond to the computer system 1200 in FIG. 6. The example network system 1300 can also include one or more networks 1304. Further, there can be one or more servers 1306 and one or more data stores 1308 in the network system 1300.

As shown in FIG. 7, the one or more example computing devices (i.e., computing systems, electronic devices, client devices, etc.) 1302 can be configured to transmit and receive information to and from various components via the one or more networks 1304. For example, multiple computing devices 1302 can communicate with one another via a Bluetooth network (e.g., 1304). In another example, multiple computing devices 1302 can communicate with one another via the Internet (e.g., 1304). In a further example, multiple computing devices 1302 can communicate with one another via a local area network (e.g., 1304).

In some embodiments, examples of computing devices 1302 can include (but are not limited to) personal computers, desktop computers, laptop/notebook computers, tablet computers, electronic book readers, mobile phones, cellular phones, smart phones, handheld messaging devices, personal data assistants (PDAs), set top boxes, cable boxes, video gaming systems, smart televisions, smart appliances, smart cameras, wearable devices, etc. In some cases, a computing device 1302 can include any device and/or system having a processor. In some case, a computing device 1302 can include any device and/or system configured to communicate via the one or more networks 1304.

Moreover, regarding the computing devices 1302, various hardware elements associated with the computing devices 1302 can be electrically coupled via a bus. As discussed above, elements of computing devices 1302 can include, for example, at least one processor (e.g., central processing unit (CPU)), at least one input device (e.g., a mouse, keyboard, button, microphone, touch sensor, controller, etc.), and at least one output device (e.g., a display screen, speaker, ear/head phone port, tactile/vibration element, printer, etc.). The computing device 1302 can also include one or more storage devices. For example, the computing device 1302 can include optical storage devices, disk drives, and solid-state storage devices (e.g., random access memory ("RAM"), read-only memory ("ROM"), etc.). In another example, the computing device 1302 can include portable or removable media devices, flash cards, memory cards, etc.

Further, the computing device(s) 1302 can include a computer-readable storage media reader, a communications device (e.g., a modem, a network card (wireless or wired), an infrared communication device, etc.). The computer-readable storage media reader can be capable of connecting with or receiving a computer-readable storage medium. The computer readable storage medium can, in some cases, represent various storage devices and storage media for temporarily and/or more permanently storing, interacting with, and accessing data. The communications device can facilitate in transmitting and/or receiving data via the network(s) 1304.

In some embodiments, the computing device 1302 can utilize software modules, services, and/or other elements residing on at least one memory device of the computing device 1302. In some embodiments, the computing device 1302 can utilize an operating system (OS) and/or a program. For example, the computing device 1302 can utilize a web browsing application to interact with and/or access various data (e.g., content) via the network(s) 1304. It should be understood that numerous variations and applications are possible for the various embodiments disclosed herein.

In some embodiments, examples of the one or more networks 1304 can include (but are not limited to) an intranet, a local area network (LAN, WLAN, etc.), a cellular network, the Internet, and/or any combination thereof. Components used for implementing the network system 1300 can depend at least in part upon a type(s) of network(s) and/or environment(s). A person of ordinary skill in the art would recognize various protocols, mechanisms, and relevant parts for communicating via the one or more networks 1304. In some instances, communication over the network(s) 1304 can be achieved via wired connections, wireless connections (WiFi, WiMax, Bluetooth, radio-frequency communications, near field communications, etc.), and/or combinations thereof.

In some embodiments, the one or more networks 1304 can include the Internet, and the one or more servers 1306 can include one or more web servers. The one or more web servers can be configured to receive requests and provide responses, such as by providing data and/or content based on the requests. In some cases, the web server(s) can utilize various server or mid-tier applications, including HTTP servers, CGI servers, FTP servers, Java servers, data servers, and business application servers. The web server(s) can also be configured to execute programs or scripts in reply to requests from the computing devices 1302. For example, the web server(s) can execute at least one web application implemented as at least one script or program. Applications can be written in various suitable programming languages, such as Java®, JavaScript, C, C# or C++, Python, Perl, TCL, etc., and/or combinations thereof.

In some embodiments, the one or more networks 1304 can include a local area network, and the one or more servers 1306 can include a server(s) within the local area network. In one example, a computing device 1302 within the network(s) 1304 can function as a server. Various other embodiments and/or applications can also be implemented.

In some embodiments, the one or more servers 1306 in the example network system 1300 can include one or more application servers. Furthermore, the one or more applications servers can also be associated with various layers or other elements, components, processes, which can be compatible or operable with one another.

In some embodiments, the network system 1300 can also include one or more data stores 1308. The one or more servers (or components within) 1306 can be configured to perform tasks such as acquiring, reading, interacting with, modifying, or otherwise accessing data from the one or more data stores 1308. In some cases, the one or more data stores 1308 can correspond to any device/system or combination of devices/systems configured for storing, containing, holding, accessing, and/or retrieving data. Examples of the one or more data stores 1308 can include (but are not limited to) any combination and number of data servers, databases, memories, data storage devices, and data storage media, in a standard, clustered, and/or distributed environment.

The one or more application servers can also utilize various types of software, hardware, and/or combinations thereof, configured to integrate or communicate with the one or more data stores 1308. In some cases, the one or more application servers can be configured to execute one or more applications (or features thereof) for one or more computing devices 1302. In one example, the one or more applications servers can handle the processing or accessing of data and business logic for an application(s). Access control services in cooperation with the data store(s) 1308 can be provided by the one or more application servers. The one or more application servers can also be configured to generate content such as text, media, graphics, audio and/or video, which can be transmitted or provided to a user (e.g., via a computing device 1302 of the user). The content can be provided to the user by the one or more servers 1306 in the form of HyperText Markup Language (HTML), Extensible HyperText Markup Language (XHTML), Extensible Markup Language (XML), or various other formats and/or languages. In some cases, the application server can work in conjunction with the web server. Requests, responses, and/or content delivery to and from computing devices 1302 and the application server(s) can be handled by the web server(s). The one or more web and/or application servers (e.g., 1306) are included in FIG. 13 for illustrative purposes.

In some embodiments, the one or more data stores 1308 can include, for example, data tables, memories, databases, or other data storage mechanisms and media for storing data. For example, the data store(s) 1308 can include components configured to store application data, web data, user information, session information, etc. Various other data, such as page image information and access rights information, can also be stored in the one or more data stores 1308. The one or more data stores 1308 can be operable to receive instructions from the one or more servers 1306. The data stores 1308 can acquire, update, process, or otherwise handle data in response to instructions.

In some instances, the data store(s) 1308 can reside at various network locations. For example, the one or more data stores 1308 can reside on a storage medium that is local to and/or resident in one or more of the computing devices 1302. The data store(s) 1308 can also reside on a storage medium that is remote from the devices of the network(s) 1304. Furthermore, in some embodiments, information can be stored in a storage-area network ("SAN"). In addition, data useful for the computing devices 1302, servers 1306, and/or other network components can be stored locally and/or remotely.

In one example, a user of a computing device 1302 can perform a search request using the computing device 1302. In this example, information can be retrieved and provided to the user (via the computing device 1302) in response to the search request. The information can, for example, be provided in the form of search result listings on a web page that is rendered by a browsing application running on the computing device 1302. In some cases, the one or more data stores 1308 can also access information associated with the user (e.g., the identity of the user, search history of the user, etc.) and can obtain search results based on the information associated with the user.

Moreover, in some embodiments, the one or more servers 1306 can each run an operating system (OS). The OS running on a respective server 1306 can provide executable instructions that facilitate the function and performance of the server. Various functions, tasks, and features of the one or more servers 1306 are possible and thus will not be discussed herein in detail. Similarly, various implementations for the OS running on each server are possible and therefore will not be discussed herein in detail.

In some embodiments, various aspects of the present disclosure can also be implemented as one or more services, or at least a portion thereof. Services can communicate using many types of messaging, such as HTML, XHTML, XML, Simple Object Access Protocol (SOAP), etc. Further, various embodiments can utilize network communicational protocols, such as TCP/IP, OSI, FTP, UPnP, NFS, CIFS, etc. Examples of the one or more networks 1304 can further include wide-area networks, virtual private networks, extranets, public switched telephone networks, infrared networks, and/or any combinations thereof.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "executable operation" is an operation performed by a computing system or a processor within a computing system. Examples of executable operations include, but are not limited to, "processing," "computing," "calculating," "determining," "displaying," "comparing," or the like. Such operations refer to actions and/or processes of the computing system, e.g., a computer, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "plurality" means two or more than two. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship. In general, the term "user" means a human being. The terms first, second, etc. may be used herein to describe various elements. These elements should not be limited by these terms, as these terms are only used to distinguish one element from another unless stated otherwise or the context clearly indicates otherwise.

It should also be appreciated that the specification and drawings are to be regarded in an illustrative sense. It can be evident that various changes, alterations, and modifications can be made thereunto without departing from the broader spirit and scope of the disclosed technology.

The corresponding structures, materials, acts, and equivalents of all means or step plus function elements in the claims below are intended to include any structure, material, or act for performing the function in combination with other claimed elements as specifically claimed.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the claims presented herein.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. A non-transitory computer-readable storage media to store instructions that, when executed by a processor, cause the processor to:
- receive, in a user device, a phone call from a caller device;
- simultaneously display, on a display screen of the user device, (i) an indication of the phone call, (ii) a first option to decline the phone call, and (iii) a second option to decline the call with a customized audio message that is based on a calendar of appointment;
- subsequent to displaying the indication of the phone call, receive a selection of the second option from a user, wherein the selection of the second option indicates that the phone call is to be declined with a customized audio message based on the calendar of appointment,
- receive one or more parameters from the calendar of appointment of a user account of the user device, the calendar being at least in part stored in the user device;
- based on the one or more parameters, facilitate generation of an audio message, wherein at least a part of the audio message is not stored prior to receiving the one or more parameters;
- facilitate transmission of the audio message to the caller device; and
- subsequent to the transmission of the audio message to the caller device, disconnect the phone call based on the selection.

2. The non-transitory computer-readable storage media of claim 1, wherein the instructions, when executed, cause the processor to facilitate generation of the audio message by:
- generating, in the user device, the audio message, subsequent to receiving the one or more parameters.

3. The non-transitory computer-readable storage media of claim 1, wherein:
- the one or more parameters comprises a parameter that provides an indication of a time duration that is received from the calendar of appointment, wherein the time duration is indicative of a duration of an appointment in the calendar at the time when the phone call is received; and
- the instructions further cause the processor to facilitate generation of the audio message by:
  - generating the audio message such that the audio message is to provide the indication of the time duration.

4. The non-transitory computer-readable storage media of claim 3, wherein the instructions further cause the processor to facilitate generation of the audio message by:
- generating the audio message such that the audio message is to indicate that a user of the user device is to call back the caller device within the time duration.

5. The non-transitory computer-readable storage media of claim 1, wherein:
- the one or more parameters received from the calendar of appointment comprises a parameter that provides an indication of a reason a user of the user device is unable to take the phone call; and
- the instructions further cause the processor to facilitate generation of the audio message by:
  - generating the audio message such that the audio message is to provide the indication of the reason the user of the user device is unable to take the phone call.

6. The non-transitory computer-readable storage media of claim 1, wherein:
- a selection of one or more parameters is received via the display screen of the user device, based on the user of the user device selecting the one or more parameters using the display screen of the user device.

7. The non-transitory computer-readable storage media of claim 1, wherein the instructions further cause the processor to facilitate generation of the audio message by:
- receiving, from the calendar, the at least one of the one or more parameters that includes information about a current appointment in the calendar for a time at which the phone call is received; and
- facilitating generation of the audio message such that the audio message includes at least part of the information.

8. The non-transitory computer-readable storage media of claim 1, wherein:
- the selection of one or more parameters is received via a microphone of the user device, based on a user of the user device verbally providing the indication of the one or more parameters.

9. The non-transitory computer-readable storage media of claim 7, wherein the-information about the current appointment in the calendar for the time at which the phone call is received comprises one or more of:
- a duration of the current appointment;
- an end time of the current appointment; or
- a nature of the current appointment.

10. The non-transitory computer-readable storage media of claim 1, wherein:
- a selection of one or more parameters is received via a User Interface (UI) displayed on the display screen of the user device.

11. The non-transitory computer-readable storage media of claim 1, wherein the instructions further cause the processor to:
- provide one or more configuration settings on the display screen of the user device,
- wherein a configuration setting is to provide an option to decline phone calls with audio messages, if the call is not answered.

12. The non-transitory computer-readable storage media of claim 1, wherein the instructions further cause the processor to:

provide one or more configuration settings on the display screen of the user device, wherein a configuration setting is to provide an option to decline phone calls with audio messages, based on calendar entry.

13. The non-transitory computer-readable storage media of claim 1, wherein the instructions further cause the processor to:

simultaneously display, on the display screen of the user device, (i) the indication of the phone call, (ii) the first option to decline the phone call, (iii) the second option to decline the call with the customized audio message that is based on the calendar of appointment, and (iv) a third option to decline the call with a text message.

14. The non-transitory computer-readable storage media of claim 1, wherein the instructions further cause the processor to:

simultaneously display, on the display screen of the user device, (i) the indication of the phone call, (ii) the first option to decline the phone call, (iii) the second option to decline the call with the customized audio message that is based on the calendar of appointment, (iv) a third option to decline the call with a text message, and (v) a fourth option to decline the call with a customized audio message.

15. The non-transitory computer-readable storage media of claim 1, wherein the instructions further cause the processor to:

simultaneously display, on the display screen of the user device, (i) the indication of the phone call, (ii) the first option to decline the phone call, (iii) the second option to decline the call with the customized audio message that is based on the calendar of appointment, (iv) a third option to decline the call with a text message, and (v) a fourth option to extend a duration of time for which the user device is to provide the indication of the phone call.

* * * * *